United States Patent [19]

Hagemann

[11] 4,204,281
[45] May 20, 1980

[54] SIGNAL PROCESSING SYSTEM FOR UNDERWATER TRANSDUCER

[76] Inventor: Julius Hagemann, 412 S. MacArthur Ave., Panama City, Fla. 32407

[21] Appl. No.: 801,674
[22] Filed: Mar. 24, 1959
[51] Int. Cl.$^2$ ............................ G01S 9/66; G01S 3/84
[52] U.S. Cl. .................................. 367/98; 367/113; 367/125; 367/900; 343/113 R
[58] Field of Search ............................ 340/1, 3, 6, 16, 5, 340/1 R, 3 R, 6 R, 16 R; 343/113, 123, 100.12

[56] References Cited

U.S. PATENT DOCUMENTS

| | | | |
|---|---|---|---|
| 2,666,192 | 1/1954 | Hunt | 340/6 |
| 2,702,379 | 2/1955 | Barton | 340/6 |
| 2,787,776 | 4/1957 | Rudy | 340/3 |
| 2,808,583 | 10/1957 | Mathes | 343/113 |
| 2,865,015 | 12/1958 | Butz, Jr. | 340/3 |
| 2,867,788 | 1/1959 | Harry | 340/3 |
| 2,887,671 | 5/1959 | Frankel et al. | 340/3 |

Primary Examiner—Richard A. Farley
Attorney, Agent, or Firm—W. O. Quesenberry; Rolla N. Carter

EXEMPLARY CLAIM

1. A high resolution sound wave detecting system having a fan-shape beam of receiver sensitivity comprising a pair of transducers having elongated active faces coplanar and in end to end relation, an output signal channel for each transducer, means including two local oscillators of different frequencies connected to heterodyne against each other for producing timing pulses having a repetition rate equal to the frequency difference of said oscillators and individually against the output signals in the two transducer channels, means for mixing the beat frequencies of the heterodyned output signals and producing therefrom signal pulses having a repetition rate equal to the frequency difference of said oscillators, an output circuit, and means responsive to a signal pulse and a timing pulse coinciding in time for passing the signal pulse to the output circuit.

4 Claims, 3 Drawing Figures

SIGNAL PROCESSING SYSTEM FOR UNDERWATER TRANSDUCER

The present invention relates generally to an arrangement in a pulse-echo or listening system for increasing in at least one dimension the directivity or resolution of the system and more particularly to such an arrangement for improving the resolution of an underwater acoustic pulse-echo system employed for scanning in range. The specific embodiments to be described were designed for utilization in systems for making facsimile recordings of the sonic echo values of a water submerged surface described in detail in my co-pending application Ser. No. 753,166 filed Aug. 4, 1958.

The invention in the aforesaid application included an electroacoustic transmitting and receiver transducer system adapted to scan in range with a narrow vertically oriented fan shaped beam and in succession adjacent narrow strips of a submerged surface, the received sonic reflections being employed to synthesize a two dimensional visible record containing information concerning the size, shape and position of objects on such submerged surface. In such high resolution sonar systems the width of the transmitted pulse is made sufficiently short so as to realize high range resolution and the transducer is "focused" to provide a very narrow fan shaped beam for realizing high resolution in azimuth.

The "focus" or directivity of an electro-acoustic transducer is a function of its dimensions and the frequency (wave length) employed, and in order to achieve the fan shaped beam pattern required for the above mentioned uses it has been considered necessary to have a very narrow long transducer and to operate at a high frequency. The following example (in round numbers) will give meaning to the relative terms used. A transducer twenty inches in length and one-sixteenth inch wide operated at one megacycle will have a fan shaped beam about one-tenth degree in width. Compressional wave energy of such a high frequency attenuates rapidly in water but has heretofore been tolerated because to lower the frequency significantly would greatly increase the length and cost of the transducer.

The primary object of the present invention is to provide a system which permits the use of smaller transducers and lower operating frequencies without sacrificing resolution and with increase in range for the same power requirement.

The invention itself together with other objects and advantages thereof will be better understood from the following description when read in connection with the accompanying drawing in which.

Figure 1:
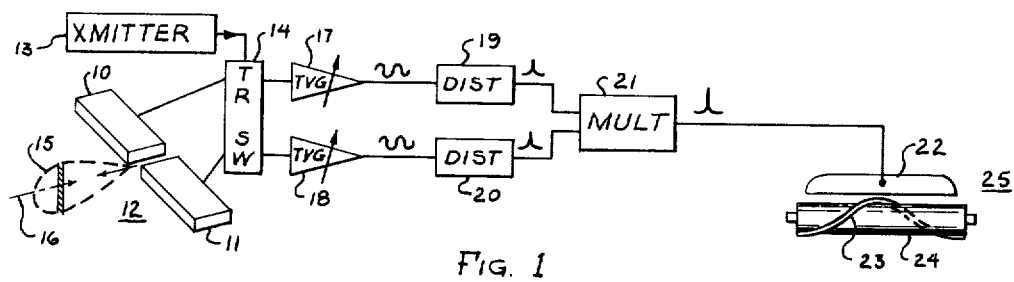
FIG. 1 is a block diagram of an embodiment utilizing the basic principle of the invention.

As illustrated in FIG. 12 the two halves 10 and 11 of a transducer 12 are arranged to be energized simultaneously by a transmitter 13 through a transmit-receive switch 14 to radiate a vertically oriented fan shape pulse of compressional wave energy, indicated at 15, along an axis 16. The reflected wave energy received by the transducer halves 10 and 11 are separately passed by the TR switch 14 through amplifiers 17 and 18, which preferably have time variable gain characteristics, to distorting circuits 19 and 20, respectively, to provide periodic spikes as by amplifying and dipping. The distorted signals having the wave form indicated are multiplied in a multiplier 21 from which they are fed to a display device 25 here shown as being supplied to the platen electrode 22 of a fascimile recorder including a cooperating helix 23 carried by a cylinder 24 which is adapted to be rotated and synchronized in any well known manner not shown. The nature of the display which can be produced by the facsimile recorder 25 and the cathode ray tubes 32 and 52 is disclosed in my co-pending application Ser. No. 753,166 filed Aug. 4, 1958. By utilizing suitable distorters 19 and 20 so that their output waves are very narrow as indicated, the signal output from the multiplier 21 will increase above a certain threshold level only when the two output signals from the distorters 19 and 20 coincide in time, and it will be evident that such coincidence occurs only for those cases where the wave front impinging upon the faces of the transducer portions 10 and 11 is very nearly perpendicular to the vertical plane defined by the transducer axis 16. The facsimile recorder 25 or other display device is adjusted to mark the recording medium only for signals exceeding the selected threshold value.

If in the arrangement shown in FIG. 1 the phase-equivalent horizontal width of the transducer 12 is three inches so that the definition at any distance within the Fresnelzone can be made three inches, at 115 kilocycles the directivity at the six-db-down points on its sensitivity lobe will be about five degrees. Now if the pulse width from the distorters 19 and 20 is of the order of one microsecond, the resulting angular resolution for operation at 115 kilocycles would be equal to 5 (5 degree beam width) divided by 8.7 (8.7 microseconds for one wave of the 115 kilocycle signal), a roughly $\frac{1}{2}$ degree. This means that the transducers 10 and 11 during reception will be effectively sensitive only for wave fronts arriving from point targets lying within $\pm\frac{1}{4}$ degree from the vertical plane defined by the transducer axis 16, hence the system has a fan shape beam of receiving sensitivity of $\frac{1}{2}$ degree in azimuth. It will be understood that this directivity is accomplished by employing the coincidence technique above described. As here shown a single transducer 12 has been utilized for both the transmission and reception, however, the use of separate transducers for transmission and reception is preferred as indicated in FIG. 2 and as assumed in FIG. 3 to be described below.

Figure 2:
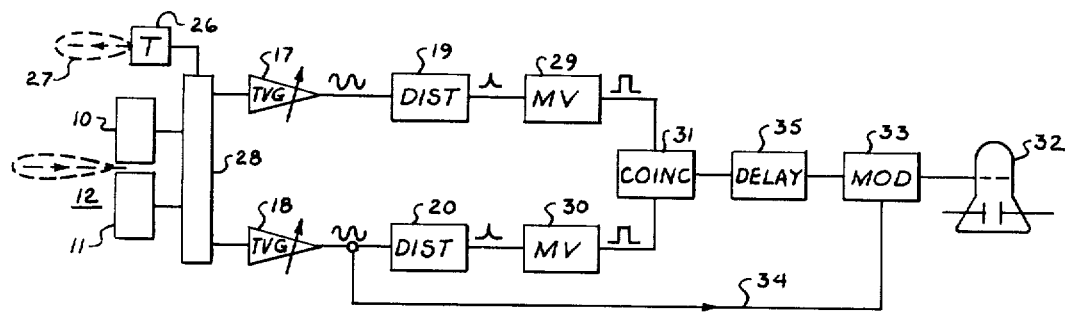
FIG. 2 is a block diagram of another embodiment of the invention.

In the embodiment of the invention shown in FIG. 2 a separate transmitter 26 is utilized for radiating into the water a short pulse of compressional wave energy as indicated by a lobe 27. As is well known the transducers 10 and 11 receive the reflected wave energy which is passed by a receive switch 28 to receiver channels including amplifiers 17 and 18 and distorters 19 and 20, the receive switch 28 having been open under the control of the transmitter 26 during and a short time after the transmission of a pulse into the water as is well known. In this embodiment of the invention the output signals of the distorters 19 and 20 are employed to trigger individul square wave generators 29 and 30 which may be monostable multivibrators. Here again the square wave output of the generators 29 and 30 may be chosen to have a width of one microsecond and fed to a coincidence circuit 31 which produces an output only upon coincidence of its two inputs, and as was the case in FIG. 1 such coincidence will occur only when the arriving wave front impinges, within the same narrow angular limits indicated above, parallel onto the faces of the transducer halves 10 and 11. The output of the coincidence circuit 31 is utilized to control a display device such as a helical recorder 25 or as here shown a cathode ray tube 32, but in order to preserve amplitude information a modulating circuit 33 is inclined in the input circuit to the display device 32 and is connected through a lead 34 to the output of the amplifier 18 so as to be controlled in accordance with the amplitude of the arriving signal. This lead 34 may of course be connected to any point in either receiver circuit where such amplitude information is available. To compensate for any time lag in the response of the modulator 33 it may be desirable to include a delay device 35 in the path of the signal output from the coincidence circuit 31. The delay device 35 is preferably of the magnetic memory type but may be any other which is not sensitive to the complex frequencies contained in the generated square waves.

In each of the systems of FIGS. 1 and 2 it is comtemplated that the vertically oriented fan shape beam transmitted into the water will subtend in azimuth an angle of approximately 5 degrees so that the accuracy of alining the receiver axis relative to the transmitting axis will not be too stringent. In order that the definition along the direction of scan, i.e., in range, be commensurate with the definition in azimuth or line width the transmitted pulse is preferably about 50 microseconds in duration which gives it a length in water of approximately three inches. These parameters including the desired definition permits the employment of the relative low frequency of 115 kilocycles per second which in turn permits the use of transducer elements of greater height, i.e., about the magnitude of one wave length, which enables them to transmit more power and have increased receiving sensitivity.

Figure 3:
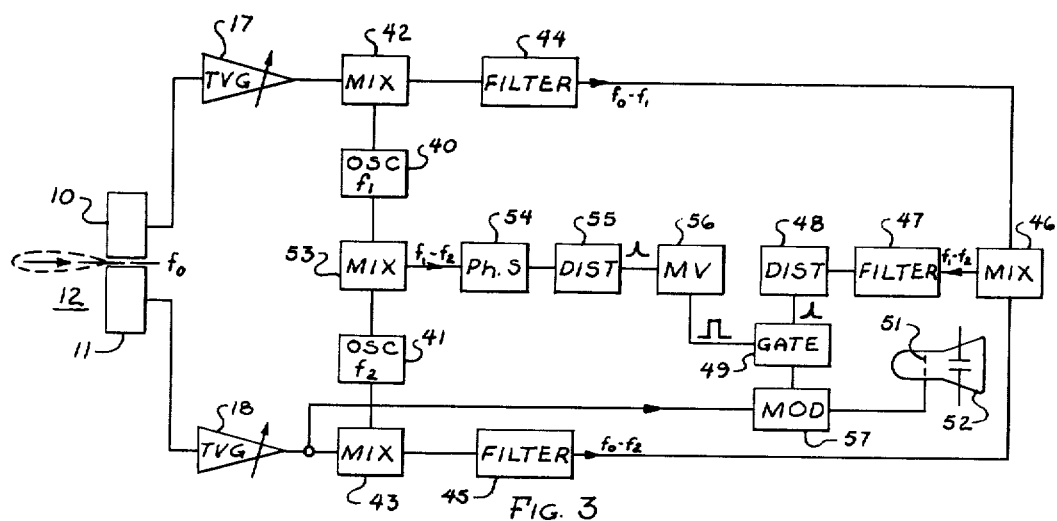
FIG. 3 is a block diagram of a receiver system incorporating still another embodiment of the invention.

In the embodiment of the invention shown in FIG. 3 the signals received by the transducer halves 10 and 11 are first treated in the same manner as in a Sector Scan Indicator (SSI) system, the characteristics of which are set forth in my co-pending application Ser. No. 677,166 filed Aug. 8, 1957 and will not here to be described; however, it will be remembered that in an SSI processing chain the signal at the operating frequency $f_0$ can be considered as merely serving to "ring" a circuit producing at the output a signal having the difference frequency of two fixed local oscillators against which the respective received signals are beat. In the present arrangement the operating frequency is cancelled in a mixer but phase information is preserved and can be subjected to highly defined analysis.

In the arrangement shown in FIG. 3 which utilizes an SSI processing chain the signals having frequency $f_0$ from the transducer halves 10 and 11 after passing through amplifiers 17 and 18 are mixed, respectively, with two frequencies $f_1$ and $f_2$ from two local oscillators 40 and 41 in mixers 42 and 43. The resulting difference frequencies $f_0-f_1$ and $f_0-f_2$ from the respective mixers 42 and 43 are passed through IF filters 44 and 45 to a mixer 46 where the operating frequency $f_0$ is cancelled and the resulting difference frequency $f_1-f_2$ is passed through a filter 47 and a distorter 48 to a gate 49. The very narrow wave shape from the distorter 48 when passed by the gate 49 is utilized to energize a display device which may be the platen of the facsimile recorder 25 of FIG. 1 or as here shown it is connected to the brightening grid 51 of a cathode ray tube 52. For controlling the gate 49 the outputs of the local oscillators 40 and 41 are mixed in a mixer 53 to provide a difference frequency $f_1-f_2$ which is passed through a phase shifter 54 to a distorter 55, the distorted output of which is employed to trigger a sqaure wave generator 56 to produce very short gating pulses for the gate 49. By suitably adjusting the phase shifter 54 the timing of the gating pulses from the square wave generator 56 can be selected so that the gate 49 passes to the brightening grid 51 only those signals originating from one and only one direction, for instance, from target points on or very close to the vertical symmetry plane of the transducer 12. As was the case in the system of FIG. 2 it is desirable to impart amplitude information to the signal applied to the brightening grid 51 and for this purpose a modulator 57 may be inclined in the circuit between the distorter 48 and the grid 51 and controlled by the amplitude of the arriving signal where it is available in the circuit, here shown as being the output of the amplifier 18.

In the system just described in connection with FIG. 3 the equivalent width of the fan shape beam of receiver sensitivity can be made very narrow. Selecting again as an example a 5 degree transducer the frequency of the oscillators 40 and 41 may be selected to produce a difference frequency $f_1-f_2$ of 10,000 cps whereby 100 microseconds (360 degrees electrically) will correspond to 5 degrees geometrically. Therefore, if the gating pulse width from the square wave generator 56 is two microseconds the angular definition is two one-hundredths of 5 degrees which is one-tenth of one degree. To obtain comparable definition in range, i.e., along the line of scan, the transmitted sonic pulse should preferably be about 50 microseconds in length (3 inches in water). Although not shown in FIG. 3, it may be desirable to insert a delay device between the gate 49 and the modulator 57 to enable the modulator 57 to adjust itself prior to the arrival of a gating signal as was mentioned in connection with FIG. 2.

It will be evident from the foregoing that the signal processing system provided by the present invention greatly reduces the length, and hence the cost, of the transducers without a corresponding reduction in performance. In fact the invention makes it feasible to employ relatively low frequencies without sacrificing resolution to obtain greater range without an increase in power requirement because of less attenuation in water for the lower sound frequency.

While for the purpose of disclosing the invention only preferred embodiments thereof have been described in detail, the invention is not limited thereto since it will be evident to those skilled in the art that various modifications may be made therein without departing from the spirit and scope of the invention intended to be covered by the appended claims.

The invention described herein may be manufactured and used by or for the Government of the United States of America for governmental purposes without the payment of any royalties thereon or therefor.

What is claimed is:

1. A high resolution sound wave detecting system having a fanshape beam of receiver sensitivity comprising a pair of transducers having elongated active faces coplanar and in end to end relation, an output signal channel for each transducer, means including two local oscillators of different frequencies connected to heterodyne against each other for producing timing pulses having a repetition rate equal to the frequency difference of said oscillators and individually against the output signals in the two transducer channels, means for mixing the beat frequencies of the heterodyned output signals and producing therefrom signal pulses having a repetition rate equal to the frequency difference of said oscillators, an output circuit, and means responsive to a signal pulse and a timing pulse coinciding in time for passing the signal pulse to the output circuit.

2. A system as defined in claim 1 wherein the output circuit includes a modulator connected to be controlled by the amplitude of the signal in one of said output channels.

3. A high resolution transducer system having a fan shape beam of sensitivity for receiving the signal echoes from pulsed transmission of compressional wave energy comprising a air of transducers having elongated active faces coplanar in end to end relation and having a width dimension substantially equal to the wave length of the transmitted energy, a receiver circuit connected to each transducer and including an amplifier having a time variable gain characteristic and means for generating pulses of uniform amplitude having a repetition rate equal to the frequency of the received signal echoes, and output circuit, means responsive to pulses in the two receiver circuits coinciding in time for energizing said output circuit, and means responsive to the amplitude of the output signal of one of said amplifiers for controlling the energy level in said output circuit.

4. A high resolution transducer system having a fan shape beam of sensitivity for receiving the signal echoes from pulsed transmission of compressional wave energy comprising a pair of transducers having elongated active faces coplanar in end to end relation and having a width demension substantially equal to the wave length of the transmitted energy, a receiver circuit connected to each transducer and including an amplifier having a time variable gain characteristic and means for generating uniform pulses related in phase corresponding to the angle the wave front of a received signal echo makes with the long dimension of said transducer faces, an output circuit, to couple said pulses in the two receiver circuits to said output circuit only when said pulses coincide in time, and means responsive to the amplitude of the output signal of one of said amplifiers for controlling the energy level in said output circuit.

* * * * *